United States Patent
Sugimoto et al.

(10) Patent No.: US 8,711,271 B2
(45) Date of Patent: Apr. 29, 2014

(54) DIGITAL PHOTOGRAPHING APPARATUS AND CONTROL METHOD FOR EVALUATING VALIDITY OF AN AUTO-FOCUS OPERATION

(75) Inventors: Kazuhiko Sugimoto, Seongnam-si (KR); Jong-hoon Won, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 325 days.

(21) Appl. No.: 13/174,933

(22) Filed: Jul. 1, 2011

(65) Prior Publication Data

US 2012/0062785 A1 Mar. 15, 2012

(30) Foreign Application Priority Data

Sep. 13, 2010 (KR) ........................ 10-2010-0089700

(51) Int. Cl.
*G03B 13/00* (2006.01)
*H04N 5/232* (2006.01)

(52) U.S. Cl.
USPC ........... 348/345; 348/349; 348/354; 348/362; 348/364; 348/365

(58) Field of Classification Search
USPC .................. 348/345, 349, 354, 362, 364, 365
See application file for complete search history.

(56) References Cited

U.S. PATENT DOCUMENTS

| | | | | |
|---|---|---|---|---|
| 4,972,265 A | * | 11/1990 | Tanaka et al. | 348/230.1 |
| 5,049,997 A | * | 9/1991 | Arai | 348/364 |
| 5,115,269 A | * | 5/1992 | Masanaga et al. | 396/106 |
| 8,103,158 B2 | * | 1/2012 | Yoshida | 396/121 |
| 2006/0120617 A1 | * | 6/2006 | Park | 382/255 |
| 2008/0068491 A1 | * | 3/2008 | Yuyama | 348/362 |
| 2008/0074530 A1 | * | 3/2008 | Okawa et al. | 348/345 |
| 2009/0073287 A1 | * | 3/2009 | Shimizu | 348/234 |
| 2009/0202172 A1 | * | 8/2009 | Shimodaira | 382/275 |
| 2011/0052173 A1 | * | 3/2011 | Yoshida | 396/213 |

* cited by examiner

*Primary Examiner* — Antoinette Spinks
(74) *Attorney, Agent, or Firm* — Drinker Biddle & Reath LLP

(57) ABSTRACT

A digital photographing apparatus includes an AF region setting unit for setting an AF region, a luminance detection area setting unit for setting a luminance detection area, a luminance calculation unit for calculating luminance values of the AF region and the luminance detection area, and a determination unit for calculating a luminance difference value that is a difference value between the luminance value of the AF region and the luminance value of the luminance detection area, and determining validity of an AF evaluation value with respect to the AF region according to the luminance difference value.

25 Claims, 9 Drawing Sheets

DIGITAL PHOTOGRAPHING APPARATUS AND CONTROL METHOD FOR EVALUATING VALIDITY OF AN AUTO-FOCUS OPERATION

CROSS-REFERENCE TO RELATED PATENT APPLICATIONS

This application claims the benefit of Korean Patent Application No. 10-2010-0089700, filed on Sep. 13, 2010, in the Korean Intellectual Property Office, the entire disclosure of which is incorporated herein by reference.

BACKGROUND

1. Field of the Invention

The invention relates to a digital photographing apparatus and a control method of performing autofocus.

2. Description of the Related Art

Most digital cameras are equipped with an autofocus function (AF) for automatically focusing on an object to be photographed to obtain a quality image. AF is a function of an optical system (camera) for automatically focusing on a particular item (object). Most compact digital cameras use a contrast detection method. For digital cameras having no AF sensor, focusing is performed by analyzing contrast of an image obtained via a charge-coupled device (CCD) or a complementary metal-oxide semiconductor (CMOS) image sensor.

In an AF system using the contrast detection method, a high frequency component of an image signal is controlled to be maximized, which may be simply embodied without using a special distance sensor. However, a fake peak may be generated according to a condition of an object and thus an object that is actually in a defocus state may be determined to be in focus, which may result in blurry image of the object being captured.

SUMMARY

Therefore, there is a need in the art for a digital photographing apparatus that compares luminance values between an AF region and a surrounding region and determines validity of a contrast peak value of the AF region so that likelihood of an AF failure may be reduced.

The invention provides a digital photographing apparatus that differently sets critical values for determining validity of a contrast peak value of an AF region according to luminance values between the AF region and a surrounding region so that reliability of AF may be improved.

According to an aspect of the invention, digital photographing apparatus includes an AF region setting unit for setting an AF region, a luminance detection area setting unit for setting a luminance detection area, a luminance calculation unit for calculating luminance values of the AF region and the luminance detection area, and a determination unit for calculating a luminance difference value that is a difference value between the luminance value of the AF region and the luminance value of the luminance detection area, and determining validity of an AF evaluation value with respect to the AF region according to the luminance difference value.

The determination unit may set different critical values for determining the validity of the AF evaluation value of the AF region according to the luminance difference value, and determining the validity of the AF evaluation value based on the set critical values.

The determination unit may set a second critical value for determining the validity of the AF evaluation value when the luminance difference value is more than or equal to a first critical value, and a third critical value for determining the validity of the AF evaluation value when the luminance difference value is less than the first critical value.

The determination unit may determine the AF evaluation value to be valid when the AF evaluation value is more than or equal to the second critical value, and the AF evaluation value to be invalid when the AF evaluation value is less than the second critical value.

The determination unit may determine the AF evaluation value to be valid when the AF evaluation value is more than or equal to the third critical value, and the AF evaluation value to be invalid when the AF evaluation value is less than the third critical value.

The second critical value may be more than or equal to the third critical value.

The determination unit may include a plurality of first critical values for determining an amount of the luminance difference value.

The determination unit may set a plurality of second critical values for determining the validity of the AF evaluation value based on the plurality of first critical values.

The determination unit may set a plurality of second critical values and a plurality of third critical values for determining the validity of the AF evaluation value based on the plurality of first critical values.

Each of the AF region and the luminance detection area may have multiple regions.

The luminance detection area may be an area adjacent to the AF region.

The AF evaluation value may be a peak value of a high frequency component of an image signal with respect to the AF region.

According to another aspect of the invention, a digital photographing apparatus for controlling a position of a focus lens according to a contrast peak value of an AF region includes a luminance detection area setting unit for setting a luminance detection area around the AF region, a luminance calculation unit for calculating a luminance value of the AF region and a luminance value of the luminance detection area, and a determination unit for comparing a first critical value with a luminance difference value between the luminance value of the AF region and the luminance value of the luminance detection area, setting different critical values according to a result of the comparison, and determining validity of the contrast peak value based on the set critical values.

The determination unit may set a critical value for determining the validity of the contrast peak value as a second critical value when the luminance difference value is more than or equal to the first critical value, and determine the contrast peak value to be invalid when the contrast peak value is less than the second critical value, and the determination unit may set a critical value for determining the validity of the contrast peak value as a third critical value when the luminance difference value is less than the first critical value, and determine the contrast peak value to be invalid when the contrast peak value is less than the third critical value.

The first critical value may be a plurality of values and a plurality of second critical values and a plurality of third critical values may be set with respect to the plurality of first critical values.

The first critical value may include a 1-1 critical value and a 1-2 critical value, a critical value for determining the validity of the contrast peak value is set to be a 2-1 critical value when the luminance difference value is more than or equal to the 1-1 critical value, the contrast peak value may be set to be invalid when the contrast peak value is less than the 2-1 critical value, and a critical value for determining the validity of the contrast peak value may be set to be a 2-2 critical value when the luminance difference value is more than or equal to the 1-2 critical value, and the contrast peak value may be set to be invalid when the contrast peak value is less than the 2-2 critical value.

The digital photographing apparatus may further include an AF calculation unit for calculating a position of a focus lens according to the contrast peak value of the AF region, wherein the AF calculation unit excludes the contrast peak value in calculating the position of the focus lens when the contrast peak value is invalid.

The AF region may be a plurality of regions and the luminance detection area is a plurality of areas around each of the plurality of AF regions.

The determination unit may include the first critical value with a luminance difference value between a luminance value of one of the plurality of AF regions and a luminance value of a luminance detection area having the maximum luminance value among a plurality of luminance detection areas around the one of the plurality of AF regions.

According to another aspect of the invention, a method of controlling a digital photographing apparatus includes setting an AF region and a luminance detection area, calculating luminance values of the AF region and the luminance detection area, calculating a luminance difference value that is a difference value between the luminance value of the AF region and the luminance value of the luminance detection area, and determining validity of an AF evaluation value with respect to the AF region according to the luminance difference value.

The determining of the validity of the AF evaluation value may include comparing the luminance difference value with a first critical value, setting different critical values for determining the validity of the AF evaluation value according to a result of the comparison, and determining the validity of the AF evaluation value based on the AF evaluation value with respect to the AF region and the different critical values.

In the determining of the validity of the AF evaluation value, the AF evaluation value may be determined to be valid when the AF evaluation value is more than or equal to a second critical value that is relatively more than or equal to the difference critical values, and the AF evaluation value may be determined to be invalid when the AF evaluation value is less than the second critical value, and the AF evaluation value may be determined to be valid when the AF evaluation value is more than or equal to a third critical value that is relatively less than the different critical values, and the AF evaluation value may be determined to be invalid when the AF evaluation value is less than the third critical value.

The first critical value may be a plurality of values and a plurality of second critical values and a plurality of third critical values may be set with respect to the plurality of first critical values.

The first critical value may include a 1-1 critical value and a 1-2 critical value, a critical value for determining the validity of a contrast peak value may be set to be a 2-1 critical value when the luminance difference value is more than or equal to the 1-1 critical value, and the contrast peak value may be set to be invalid when the contrast peak value is less than the 2-1 critical value, and a critical value for determining the validity of the contrast peak value may be set to be a 2-2 critical value when the luminance difference value is more than or equal to the 1-2 critical value, and the contrast peak value may be set to be invalid when the contrast peak value is less than the 2-2 critical value.

The AF evaluation value may be a peak value of a high frequency component of an image signal with respect to the AF region.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
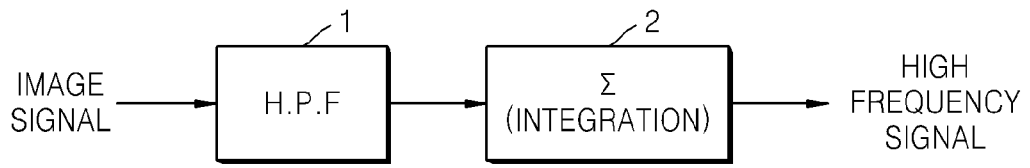
FIG. 1 is a block diagram of an AF detecting circuit according to a conventional technology.

Hereinafter, the invention will be described in detail by explaining exemplary embodiments of the invention with reference to the attached drawings. Like reference numerals in the drawings denote like elements.

Figure 2:
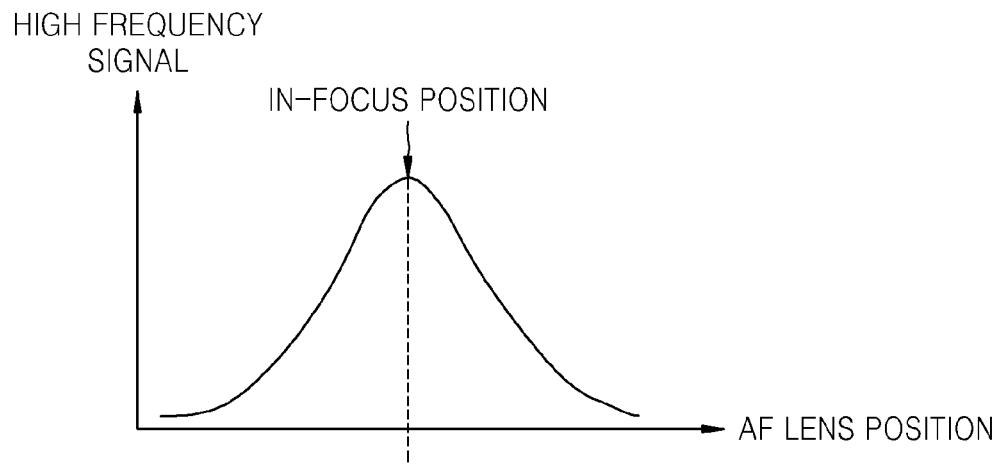
FIG. 2 is a graph for explaining an AF control by the AF detecting circuit of FIG. 1.

FIG. 1 is a block diagram of an AF detecting circuit according to a conventional technology. FIG. 2 is a graph for explaining an AF control by the AF detecting circuit of FIG. 1.

Referring to FIGS. 1 and 2, the AF detecting circuit includes a high pass filter (HPF) 1 and an integrator 2. According to a contrast detection method, an imaging device such as a charge-coupled device (CCD) photoelectrically converts an image of an object to generate an image signal. The generated image signal is input to the AF detecting circuit shown in FIG. 1 and a high frequency component is extracted from an image signal of an AF region selected from or set in the captured image. An AF calculation unit (not shown) calculates an AF evaluation value from a high frequency component extracted by the AF detecting circuit, and detects an in-focus position of a photographing lens based on the AF evaluation value. As illustrated in FIG. 2, while a focus lens (not shown) is moved in a direction along an optical axis, an AF evaluation value at each position (focus position) of the focus lens is calculated and a position where the AF evaluation value is maximized, that is, the maximum AF value, is detected as an in-focus position. The AF evaluation value is a value obtained by passing a luminance component through a high pass filter and then integrating the luminance component.

In the contrast type AF system for controlling a high frequency component of an image signal to be maximized, a fake peak may be generated according to a condition of an object.

Thus a user may determine that the object that is actually in a defocus state, that is, in a state in which a lens is deviated from an in-focus position, is focused. A reason for the generation of a fake peak will be described with reference to FIGS. 3A-3D and 4A-4B.

Figure 3A:
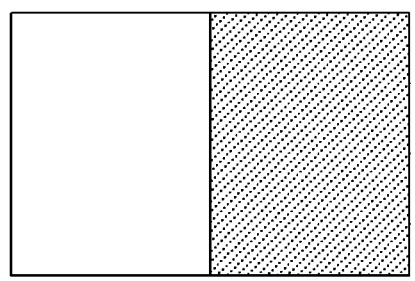
FIGS. 3A-3D and 4A-4B are diagrams and graphs for explaining a reason for generation of a fake peak in a contrast peak detection method.
Figure 3B:
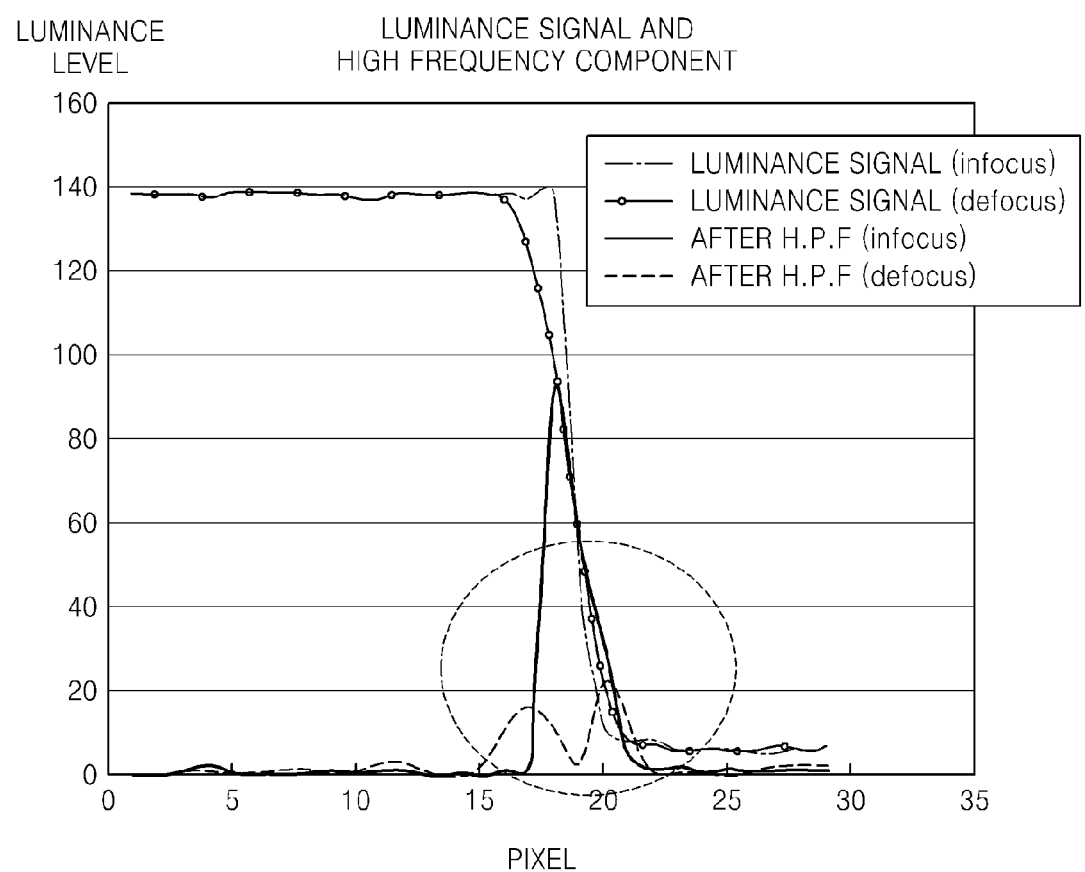
Figure 3C:
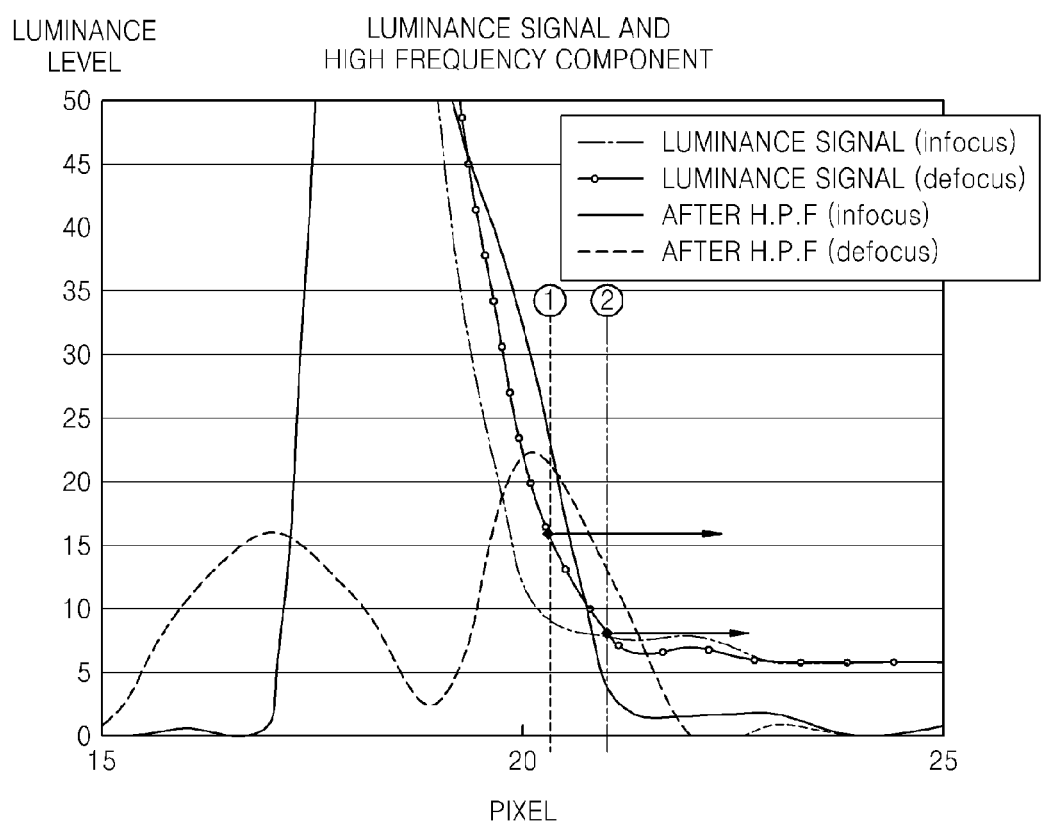
Figure 3D:
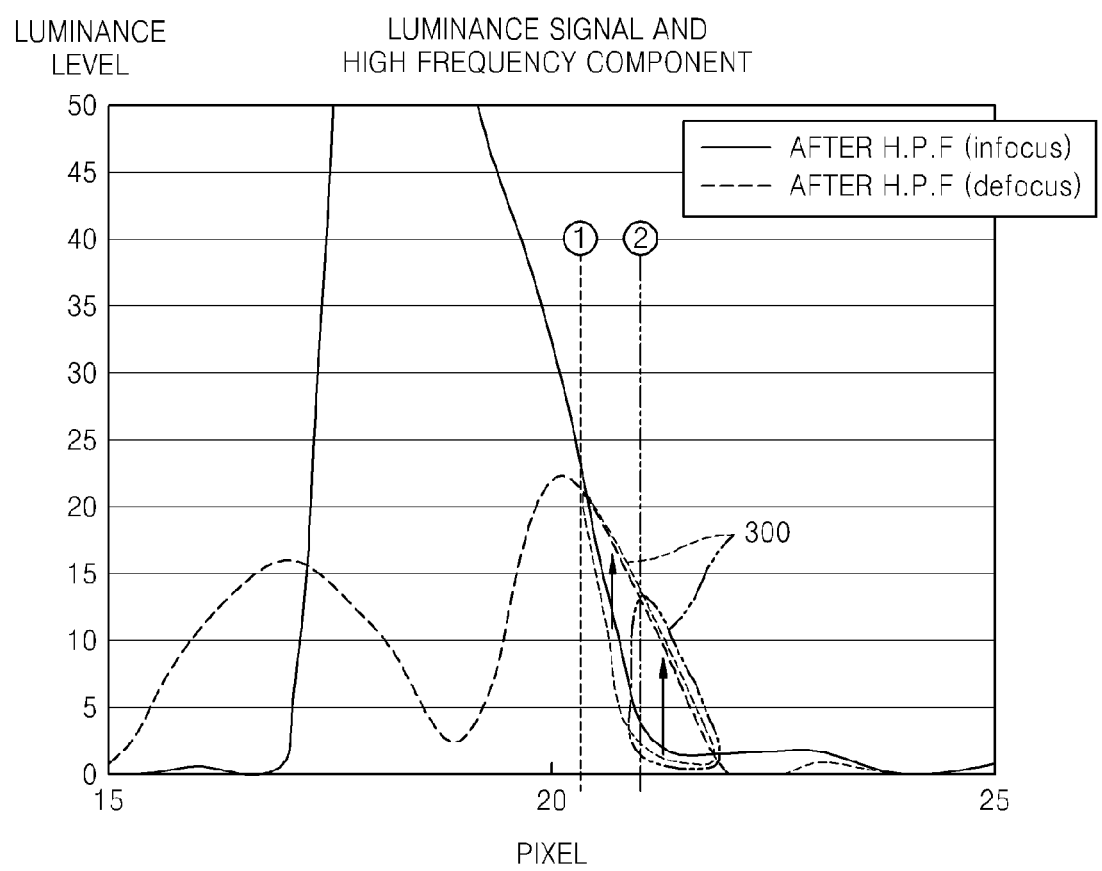

FIG. 3A illustrates a black/white chart. FIG. 3B is a graph showing a luminance signal and a high frequency component obtained by moving vertically an edge surface of the black/white chart of FIG. 3A. FIGS. 3C and 3D are enlarged graphs showing a portion of the graph of FIG. 3B indicated by a dashed circle.

As illustrated in FIG. 3C, the high frequency component after passing through the HPF 1 becomes wider than a corresponding original edge component. Especially, the distribution of the high frequency component in a defocus state is wider than that in an in-focus state. In FIG. 3C, the luminance signal hardly changes in an area to the right of a vertical dot-dot-dashed line indicated by the number 2. However, in an area to the right of a vertical dashed line indicated by the number 1, while the luminance signal hardly changes in the in-focus state, the level of the luminance signal increases in the defocus state and thus areas where the high frequency component increases appear.

Referring to FIG. 3D, a portion indicated by the reference number 300 indicates a reason for a fake peak. The vertical dashed line 1 indicates a portion affected by defocus, whereas the vertical dot-dot-dashed line 2 indicates a portion affected by the HPF. That is, an image signal and the high frequency component are affected by optical characteristics and filter characteristics.

A high frequency component of an image signal has the same shape as an impulse response of an edge. Even when no contrast exists in an AF region, if a high luminance component exists around the AF region, a high frequency component of the surrounding area enters the AF region and affects a high frequency component of the AF region. For example, in a scene where two regions having different luminance levels from each other exist, a high frequency component of an edge portion between the two regions, after passing through the HPF, is wider than the edge portion. An image signal in a defocus state is wider than that in an in-focus state. That is, when an object having a level of luminance quite different from that of an AF region exists around the AF region, a fake peak may be easily generated.

Figure 4A:
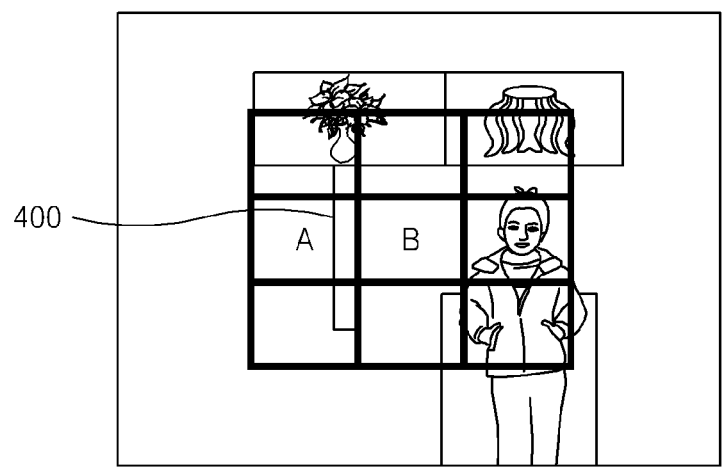
Figure 4B:
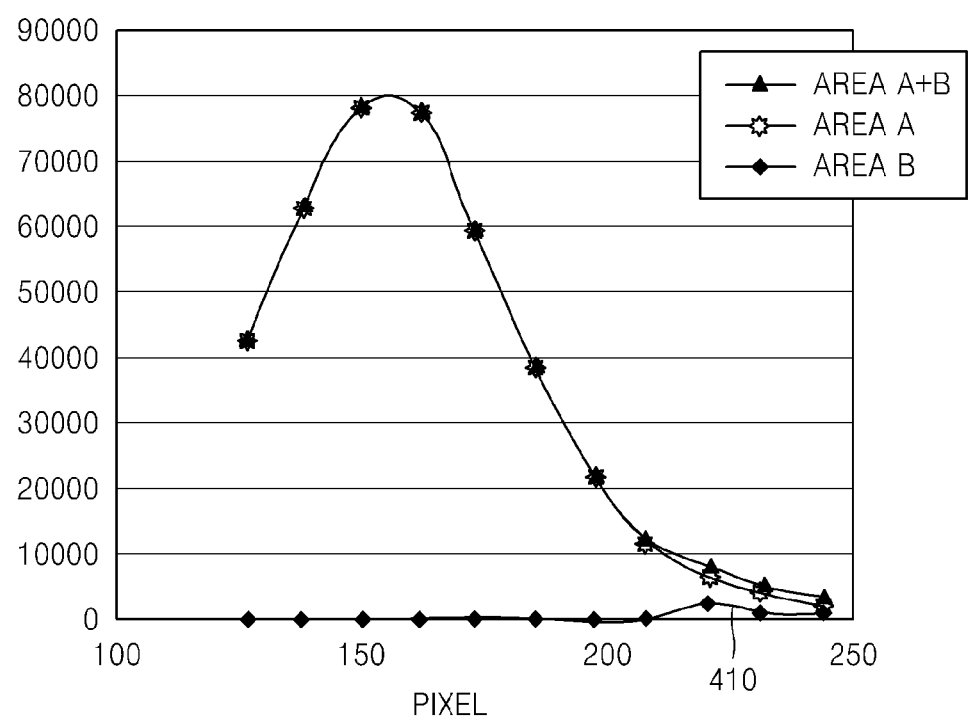

In FIG. 4A, while an AF region (Area B) has no high frequency component, an object 400 having a big difference in luminance exists around the AF region (Area A). In this case, as described with reference to FIGS. 3A-3D, a fake peak may be easily generated. As illustrated in FIG. 4B, it can be seen that, although a high frequency object does not exist in the area B, a fake peak 410 is generated by being affected by the object 400 having a relatively high luminance level existing in the area A adjacent to the area B. However, it can be seen that a fake peak is not generated with respect to the high luminance object itself (area A or area A+B).

Figure 5:
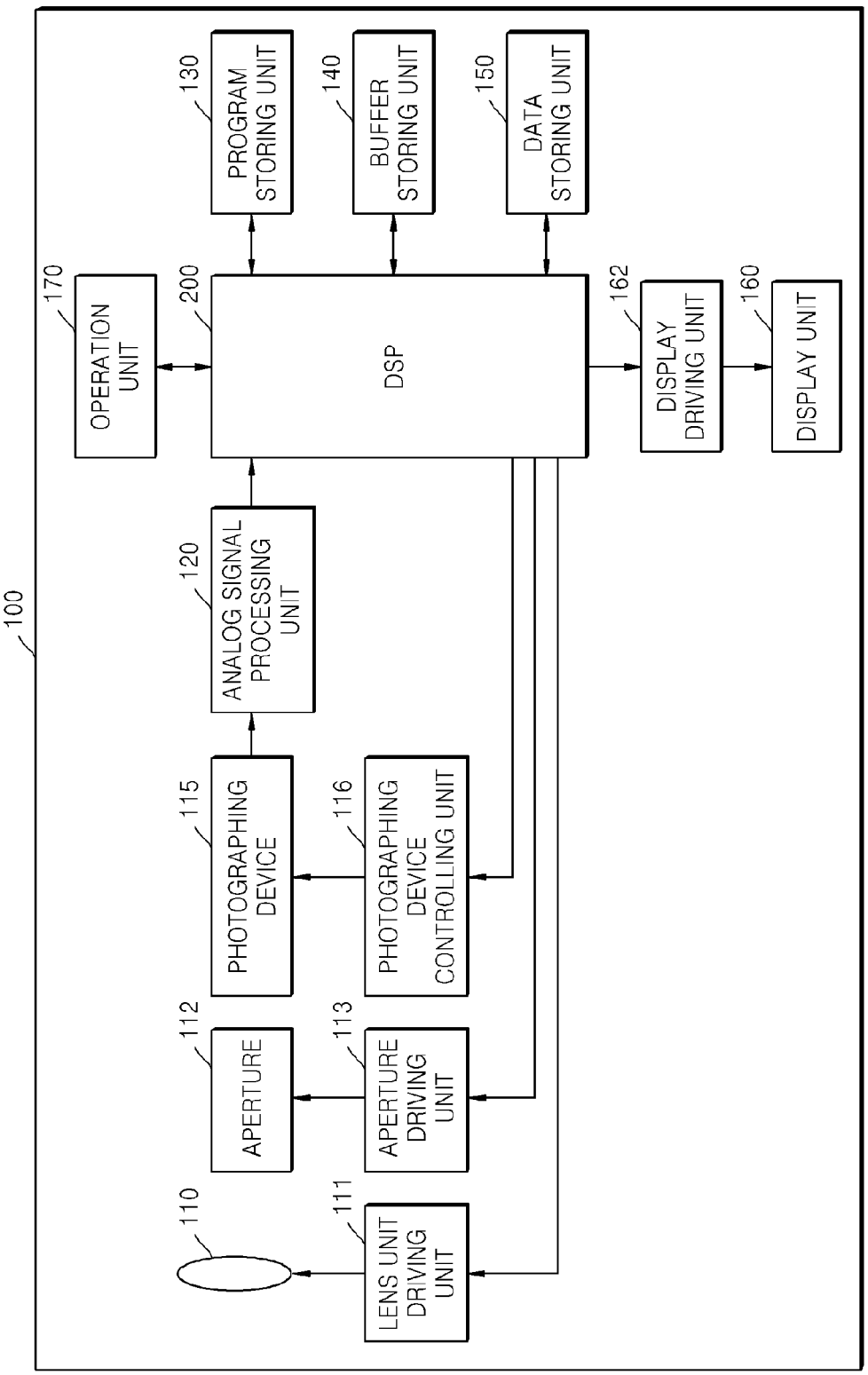
FIG. 5 is a schematic block diagram showing a structure of a digital photographing apparatus according to an embodiment of the invention.

FIG. 5 is a schematic block diagram showing a structure of a digital camera 100 according to an embodiment of the invention. The digital camera 100 is described as an example of a digital photographing apparatus according to the invention. However, the digital photographing apparatus is not limited to the digital camera 100 of FIG. 5 and may be applied to digital apparatuses such as camera phones, personal digital assistants (PDAs), portable multimedia players (PMPs), and the like.

The digital camera 100 according to an embodiment of the invention may include a lens unit 110, a lens unit driving unit 111, an aperture 112, an aperture driving unit 113, a photographing device 115, a photographing device controlling unit 116, an analog signal processing unit 120, a program storing unit 130, a buffer storing unit 140, a data storing unit 150, a display driving unit 162, a display unit 160, a digital signal processor (DSP) 200, and an operation unit 170. The lens unit 110, the lens unit driving unit 111, the aperture 112, the aperture driving unit 113, the photographing device 115, the photographing device controlling unit 116, and the analog signal processing unit 120 may be referred to as a photographing portion.

The lens unit 110 focuses incident light. The lens unit 110 includes a zoom lens for controlling a viewing angle to be increased or decreased according to a focal length and a focus lens for focusing on an object. Each of the zoom lens and the focus lens may be formed of a single lens or a group of a plurality of lenses. The aperture 112 adjusts the quantity of incident light by controlling a degree of opening.

The lens unit driving unit 111 and the aperture driving unit 113 respectively drive the lens unit 110 and the aperture 112 by receiving a control signal from the DSP 200. The lens unit driving unit 111 adjusts the focal length by controlling the position of the lens unit 110 and performs operations of auto-focusing, zooming, and focus change. The aperture driving unit 113 adjusts the degree of opening of the aperture 112. Especially, the aperture driving unit 113 adjusts an f number or an aperture value to perform operations of auto-focusing, auto-exposure correction, focus change, and adjustment of depth of field.

An optical signal passing through the lens unit 110 forms an image of an object on a light receiving surface of the photographing device 115. The photographing device 115 may employ a CCD, a complementary metal oxide semiconductor image sensor (CIS), or a high speed image sensor for converting the optical signal to an electric signal. The photographing device controlling unit 116 may adjust sensitivity of the photographing device 115. The photographing device controlling unit 116 may control the photographing device 115 according to a control signal automatically generated in response to an image signal that is input in real time, or a control signal manually input by an operation of a user.

An exposure time of the photographing device 115 is adjusted by a shutter (not shown). The shutter includes a mechanical shutter for controlling input of light by using a blade and an electronic shutter for controlling exposure by supplying an electrical signal to the photographing device 115. The analog signal processing unit 120 performs noise reduction processing, gain adjustment, waveform shaping, and analog-digital conversion with respect to an analog signal supplied by the photographing device 115.

The operation unit 170 may input a control signal input externally, for example, by a user. The operation unit 170 may include a shutter-release button for inputting a shutter-release signal to capture an image by allowing the photographing device 115 to be exposed to light for a predetermined time, a power button for inputting a control signal for powering on/off the digital camera 100, a wide-zoom button and a tele-zoom button for respectively making a viewing angle wide or narrow according to an input, and a variety of function buttons for inputting a text, selecting a mode such as a photographing mode or a reproduction mode, selecting a white balance setting function, or selecting an exposure setting function. Although the operation unit 170 may have a variety of button shapes as described above, the invention is not limited thereto and any shape such as a keyboard, a touch pad, a touch screen, or a remote controller used by a user for input may be employed therefor.

The digital camera 100 may further include a program storing unit 130 for storing a program such as an operation system or application system for operating the digital camera 100, a buffer storing unit 140 for temporarily storing data needed for operation or result data, and a data storing unit 150 for an image file including an image signal and various information needed for the program.

The digital camera 100 includes a display unit 160 to display an operation state thereof or image information captured by the digital camera 100. The display unit 160 may provide a user with visible information and audible information. To provide visible information, the display unit 160 may be formed of, for example, a liquid crystal display (LCD) panel or an organic light emitting display (OLED) panel. The display driving unit 162 provides a driving signal to the display unit 160.

The digital camera 100 includes the DSP 200 for processing an input image signal and controlling the respective constituent elements according to the input image signal or an external input signal. The DSP 200 may reduce noise with respect to input image data and perform image signal processing for improvement of image quality, such as, gamma correction, color filter array interpolation, color matrix, color correction, or color enhancement. Also, for the improvement of image quality, an image file may be generated by compressing image data generated by performing image signal processing, or image data may be restored from the image file. The compression format of an image may be reversible or irreversible. As an example of an appropriate format, a joint photographic experts group (JPEG) format or a JPEG 2000 format may be used. The compressed data may be stored in the data storing unit 150. Also, the DSP 200 may functionally perform sharpening processing, color processing, blur processing, edge emphasis processing, image analysis processing, image recognition processing, or image effect processing. The image recognition processing may include face recognition processing or scene recognition processing. For example, generation of and synthesis processing on an image such as luminance level adjustment, color correction, contrast adjustment, contour emphasis adjustment, screen division process, or character image may be performed.

Also, the DSP 200 may generate a control signal to control auto-focusing, zoom change, focus change, or auto-exposure correction, provide the control signal to the lens unit driving unit 111, the aperture driving unit 113, and the photographing device controlling unit 116, and generally control the operations of the constituent elements such as the shutter or a flash provided in the digital camera 100, by executing the program stored in the program storing unit 130 or using a separately provided module.

Figure 6:
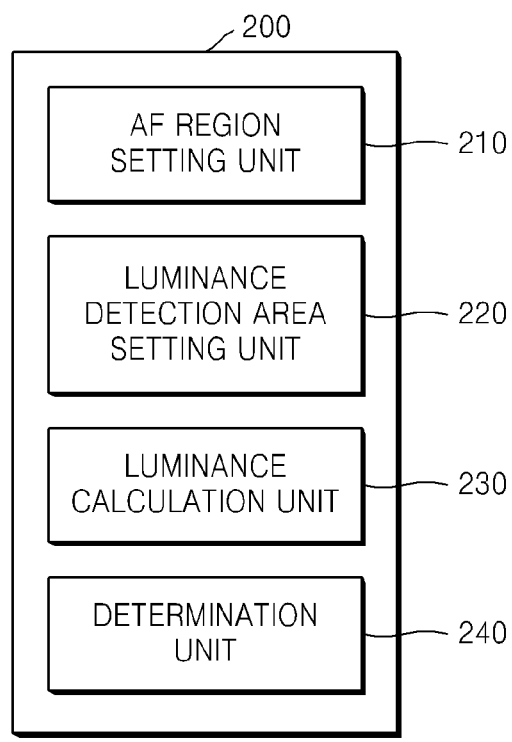
FIG. 6 is a schematic block diagram of a digital signal processing unit of FIG. 5.

FIG. 6 is a schematic block diagram of the DSP 200 of FIG. 5. Referring to FIG. 6, the DSP 200 includes an AF region setting unit 210, a luminance detection area setting unit 220, a luminance calculation unit 230, and a determination unit 240. The DSP 200 and a digital photographing apparatus defined in the accompanying claims should be understood to have the same meaning.

The AF region setting unit 210 sets an area for AF in an input image. The AF region may be one or multiple regions. The luminance detection area setting unit 220 sets an area to remove influence of a fake peak generated during detection of contrast in the input image. The luminance detection area may be one or multiple regions set around or adjacent to the AF region. For example, when the area B is set to be an AF region in FIG. 4A, the area A, that is, a left side area adjacent to the area B, and upper, lower, and right side areas may be set to be the luminance detection area.

The luminance calculation unit 230 calculates a luminance value in the set AF region and a luminance value in the luminance detection area. The determination unit 240 calculates a luminance difference value, that is, a difference value between the luminance value of the AF region and the luminance value of the luminance detection area. The validity of an AF evaluation value of the AF region is determined according to the luminance difference value. The AF evaluation value is a peak value of a high frequency component of an image signal with respect to the AF region. The validity means whether a peak value is an effective value by determining whether the peak value is a fake peak as described above.

The determination unit 240 may set critical values different from one another to determine the validity of an AF evaluation value for an AF region according to the above-described luminance difference value. Different critical values are set for a case in which the luminance difference value is more than or equal to a particular critical value and a case in which the luminance difference value is less than the particular critical value. The validity of an AF evaluation value is determined based on the set critical values. That is, when the luminance difference value is large, a reference value for determining the validity of a peak value is set to be large. When the luminance difference value is small, the reference value for determining the validity of a peak value is set to be small. Although, in the above description, two reference values are used for determining the validity of a peak value, the invention is not limited thereto and more reference values may be used therefor. Also, although, in the above description, one reference value is used for determining whether the luminance difference value is large, the invention is not limited thereto and a plurality of reference values may be set and critical values for determining the validity of a peak value according to each reference value may be described. Also, a reference value for determining the validity of a peak value only when the luminance difference value is large may be set. The critical value for determining the amount of the luminance difference value and the critical values for determining the validity of a peak value are values that may be freely set.

In detail, the determination unit 240 sets a second critical value for determining the validity of an AF evaluation value when the luminance difference value is more than or equal to a first critical value, and a third critical value for determining the validity of an AF evaluation value when the luminance difference value is less than the first critical value. The third critical value may not be set. When the second critical value is set, the AF evaluation value is determined to be valid when the AF evaluation value is more than or equal to the second critical value, and to be invalid when the AF evaluation value is less than the second critical value. Also, when the third critical value is set, the AF evaluation value is determined to be valid when the AF evaluation value is more than or equal to the third critical value, and to be invalid when the AF evaluation value is less than the third critical value. The second critical value is more than or equal to the third critical value. Although only one value is set as the first critical value, the invention is not limited thereto and a plurality of first critical values such as a 1-1 critical value, a 1-2 critical value, a 2-1 critical value, a 2-2 critical value, a 3-1 critical value, and a 3-2 critical value may be set. Only when the luminance difference value is more than or equal to the first critical value, the 1-1 critical value, or the 1-2 critical value, the second critical value, the 2-1 critical value, or the 2-2 critical value is set so that the validity of a peak value may be determined.

Although it is not illustrated in FIG. 6, the DSP 200 may further include an AF calculation unit for performing AF according to the validity of an AF evaluation value determined by the determination unit 240 and controlling a focus lens to be moved to a focus lens position where a contrast value is the maximum. Peak values determined to be invalid are excluded from the AF calculation.

Figure 7A:
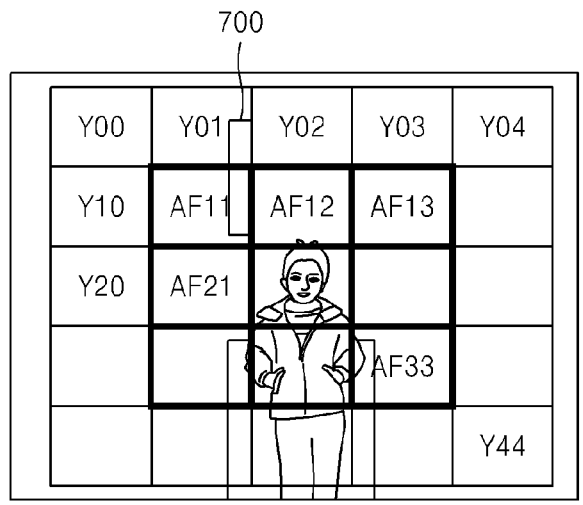
FIGS. 7A and 7B are respectively a view and a graph for explaining a method of controlling a digital photographing apparatus according to another embodiment of the invention.
Figure 7B:
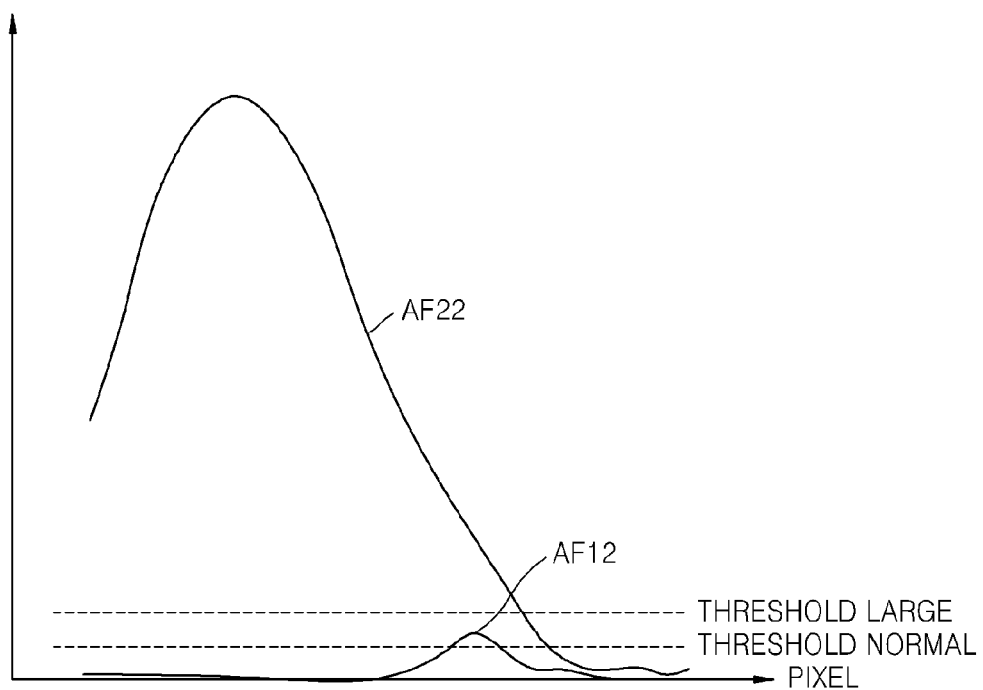

FIGS. 7A and 7B are respectively a view and a graph for explaining a method of controlling a digital photographing apparatus according to another embodiment of the invention. Referring to FIG. 7A, 3×3 AF regions (AF11 to AF33) and 5×5 luminance detection areas (Y00 to Y44) are illustrated. Also, an object 700 having a high luminance exists. Although a focus is formed in the AF region AF22 where a main object exist in an image of FIG. 7A, as described with reference to FIGS. 4A and 4B, since the object having a high luminance is located close to the AF region AF12, a fake peak may be generated and thus defocus is generated in the AF region AF12.

It is assumed that a maximum luminance Yij of a luminance detection area is Ymax_ij and critical values that are references for determining whether the maximum value of a high frequency component of the AF region (AFij) is valid are referred to as THRij (i=1~3, j=1~3).

The maximum luminance Ymax of a luminance detection area is obtained. For example, the maximum luminance Ymax is the maximum luminance value among those of the luminance detection areas (Y11, Y02, Y13, and Y22) adjacent to the AF region AF12 on left, upper, right, and lower sides thereof. That is, Ymax=max(Yi−1j, Yi+1j, Yij−1, Yij+1).

A luminance difference value diffY between an AF region and surrounding luminance detection areas is obtained. The luminance difference value is expressed by Mathematical Expression 1.

if(maxY>Yij)then diffY=maxY−Yij;
   else diffY=0;   [Mathematical Expression 1]

The critical values for determining the validity of a peak value of a high frequency component of a corresponding AF region based on the luminance difference value diffY are determined according to Mathematical Expression 2.

if(diffY>DIFF_LARGE)then
   THRij=THRESHOLD_LARGE, else
   THRij=THRESHOLD_NORMAL   [Mathematical Expression 2]

"DIFF_LARGE" is a critical value that is a reference value used in determining whether the maximum luminance of a luminance detection area is more than or equal to the maximum luminance of a corresponding AF region. "THRESHOLD_LARGE" and "THRESHOLD_NORMAL" are different critical values for determining the validity of a peak value of a high frequency component of an AF region.

Referring to FIG. 7B, an AF peak value curve with respect to the AF region AF12 is illustrated. Although a fake peak is generated due to the influence of the object 700 having a high luminance existing in an area adjacent to the AF region AF12, the critical values for determining the validity of a peak value calculated by Mathematic Expressions 1 and 2, that is, a critical value of Mathematic Expression 1 due to the influence of the object 700 having a high luminance, is set to be THRESHOLD_LARGE. Accordingly, since the peak value of a high frequency component with respect to the AF region AF12 is less than the THRESHOLD_LARGE, the peak value is determined to be invalid. The validity of a peak value of each of all AF regions AF11 to AF33 is determined in the above method. The validity is determined according to the critical values (THRESHOLD_LARGE or THRESHOLD_NORMAL) differently set according to a luminance difference between a corresponding AF region and a surrounding luminance detection area. The critical values (THRESHOLD_LARGE or THRESHOLD_NORMAL) may be set to be plural as described above.

Figure 8:
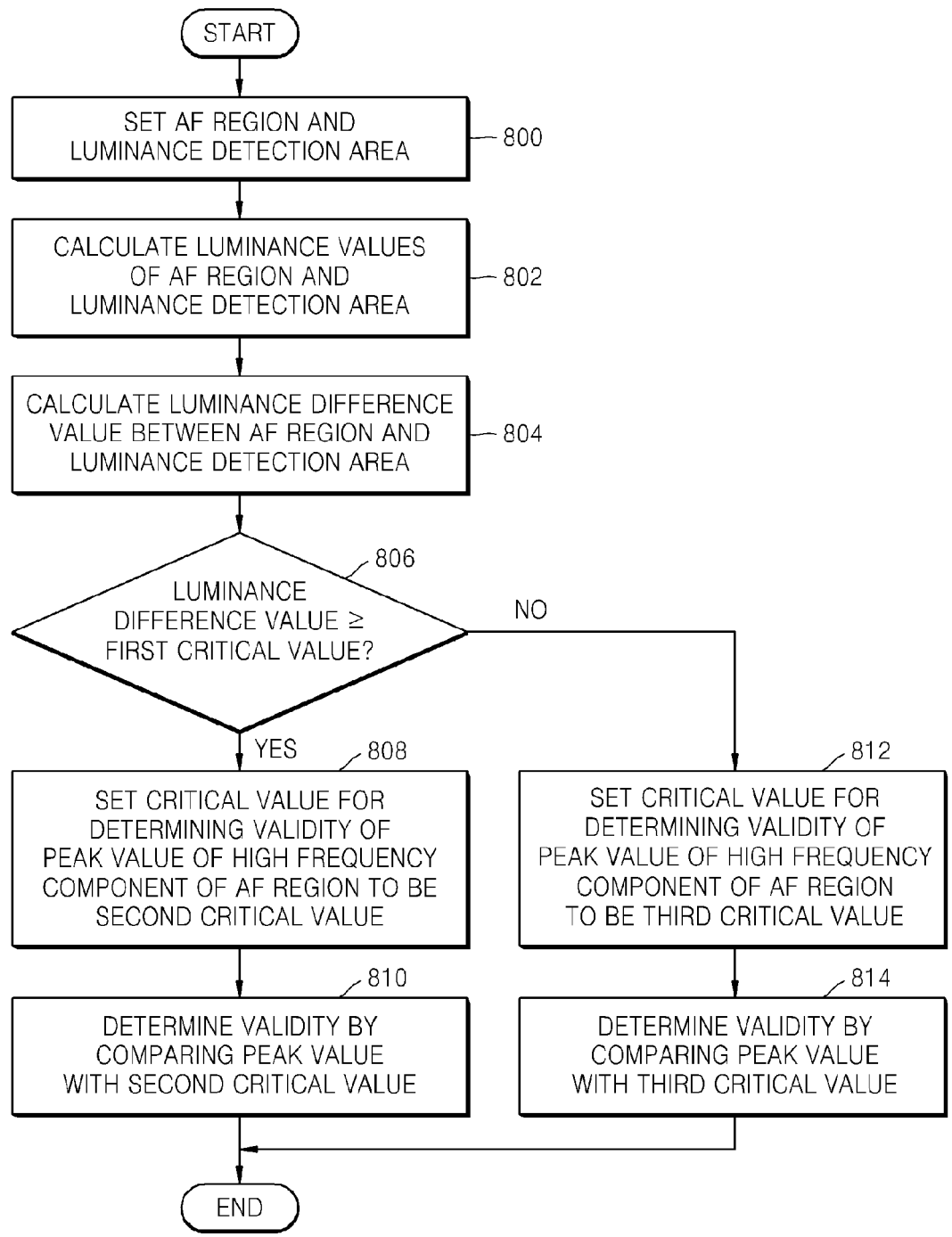
FIG. 8 is a flowchart for explaining a method of controlling a digital photographing apparatus according to another embodiment of the invention.

FIG. 8 is a flowchart for explaining a method of controlling a digital photographing apparatus according to another embodiment of the invention. Referring to FIG. 8, in Operation 800, an AF region and a luminance detection area are set. The AF region and the luminance detection area may each be one or multiple regions.

In Operation 802, luminance values of the AF region and the luminance detection area are calculated. In Operation 804, a luminance difference value between the AF region and the luminance detection area is calculated. A luminance difference value between the AF region and an area of the luminance detection area having the greatest luminance value may be used.

In Operation 806, it is determined whether the luminance difference value is more than or equal to a first critical value. The first critical value is a reference value for determining whether the maximum luminance of a luminance detection area is more than or equal to the maximum luminance of a corresponding AF region, and is a value that may be freely set.

In Operation 806, when the luminance difference value is more than or equal to the first critical value, the method proceeds to Operation 808 in which a critical value for determining the validity of a peak value of a high frequency component in an AF region is set to be a second critical value. In Operation 810, the validity is determined by comparing the peak value and the second critical value. That is, when the peak value is more than or equal to the second critical value, the peak value is determined to be a valid peak value. When the peak value is less than the second critical value, the peak value is determined to be an invalid peak value.

The second critical value is a critical value for determining the validity of a peak value of a high frequency component of a corresponding AF region, and is a value that may be freely set.

In Operation 806, when the luminance difference value is less than the first critical value, the method proceeds to Operation 812 in which a critical value for determining the validity of a peak value of a high frequency component in an AF region is set to be a third critical value. In Operation 814, the validity is determined by comparing the peak value and the third critical value. That is, when the peak value is more than or equal to the third critical value, the peak value is determined to be a valid peak value. When the peak value is less than the third critical value, the peak value is determined to be an invalid peak value.

The third critical value is a critical value for determining the validity of a peak value of a high frequency component of a corresponding AF region, and is a value that may be freely set.

Also, the second critical value is a more than or equal to the third critical value and the second or third critical value may be set according to whether a difference between the luminance value of a corresponding AF region and the maximum luminance value of an adjacent luminance detection area is large. Also, although two critical values for determining the validity of a peak value of a high frequency component are described, the invention is not limited thereto and one or more critical values may be used.

As described above, according to the invention, since the validity of a contrast peak value of an AF region is determined by comparing luminance values between the AF region and a surrounding region, likelihood of an AF failure may be reduced.

Also, reliability in the determination of a peak by a high frequency component of an AF region may be improved by excluding an effect due to a fake peak generated due to optical characteristics and high frequency filter characteristics.

Furthermore, since critical values for determining the validity of a contrast peak value of an AF region are differently set according to a luminance difference value between the AF region and a surrounding region, reliability of AF may be improved.

As the invention allows for various changes and numerous embodiments, particular embodiments are illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the description of the invention, certain detailed explanations of related art are omitted when it is deemed that they may unnecessarily obscure the essence of the invention.

The terms such as "first" and "second" are used herein merely to describe a variety of constituent elements, but the constituent elements are not limited by the terms. The terms are used only for the purpose of distinguishing one constituent element from another constituent element.

The terms used in the current specification are used for explaining a specific exemplary embodiment, not limiting the inventive concept. Thus, the expression of singularity in the specification includes the expression of plurality unless clearly specified otherwise in context. Also, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

The device described herein may comprise a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A digital photographing apparatus comprising:
   an auto-focus (AF) region setting unit configured to set an AF region of a digital image;
   a luminance detection area setting unit configured to set a luminance detection area of the digital image, wherein the luminance detection area is separate from the AF region;

a luminance calculation unit configured to calculate luminance values of a high frequency signal corresponding to the AF region and corresponding to the luminance detection area; and a determination unit configured to calculate a luminance difference value that is a difference between the luminance value of the AF region and the luminance value of the luminance detection area, and configured to determine validity of an AF evaluation value with respect to the AF region according to the luminance difference value.

2. The digital photographing apparatus of claim 1, wherein the determination unit is further configured to set different critical values for determining the validity of the AF evaluation value of the AF region according to the luminance difference value, and further configured to determine the validity of the AF evaluation value based on the set critical values.

3. The digital photographing apparatus of claim 2, wherein the determination unit is further configured to set a second critical value for determining the validity of the AF evaluation value when the luminance difference value is more than or equal to a first critical value, and to a third critical value for determining the validity of the AF evaluation value when the luminance difference value is less than the first critical value.

4. The digital photographing apparatus of claim 3, wherein the determination unit is further configured to determine the AF evaluation value to be valid when the AF evaluation value is more than or equal to the second critical value, and the AF evaluation value to be invalid when the AF evaluation value is less than the second critical value.

5. The digital photographing apparatus of claim 3, wherein the determination unit is further configured to determine the AF evaluation value to be valid when the AF evaluation value is more than or equal to the third critical value, and the AF evaluation value to be invalid when the AF evaluation value is less than the third critical value.

6. The digital photographing apparatus of claim 3, wherein the second critical value is more than or equal to the third critical value.

7. The digital photographing apparatus of claim 2, wherein the determination unit comprises a plurality of first critical values for determining an amount of the luminance difference value.

8. The digital photographing apparatus of claim 7, wherein the determination unit is further configured to set a plurality of second critical values for determining the validity of the AF evaluation value based on the plurality of first critical values.

9. The digital photographing apparatus of claim 7, wherein the determination unit is further configured to set a plurality of second critical values and a plurality of third critical values for determining the validity of the AF evaluation value based on the plurality of first critical values.

10. The digital photographing apparatus of claim 1, wherein each of the AF region and the luminance detection area has multiple regions.

11. The digital photographing apparatus of claim 1, wherein the luminance detection area is an area adjacent to the AF region.

12. The digital photographing apparatus of claim 1, wherein the AF evaluation value is a peak value of a high frequency component of an image signal with respect to the AF region.

13. A digital photographing apparatus for controlling a position of a focus lens according to a contrast peak value of an auto-focus (AF) region of a digital image, the digital photographing apparatus comprising:

a luminance detection area setting unit configured to set a luminance detection area around the AF region, wherein the luminance detection area is separate from the AF region;

a luminance calculation unit configured to calculate luminance values of a high frequency signal corresponding to the AF region and corresponding to the luminance detection area; and a determination unit configured to compare a first critical value with a luminance difference value between the luminance value of the AF region and the luminance value of the luminance detection area, and to set different critical values according to a result of the comparison, and to determine validity of the contrast peak value based on the set critical values.

14. The digital photographing apparatus of claim 13, wherein the determination unit is further configured to set a critical value for determining the validity of the contrast peak value as a second critical value when the luminance difference value is more than or equal to the first critical value, and to determine the contrast peak value to be invalid when the contrast peak value is less than the second critical value, and wherein the determination unit is further configured to set a critical value for determining the validity of the contrast peak value as a third critical value when the luminance difference value is less than the first critical value, and to determine the contrast peak value to be invalid when the contrast peak value is less than the third critical value.

15. The digital photographing apparatus of claim 14, wherein the first critical value is a plurality of values and a plurality of second critical values and a plurality of third critical values are set with respect to the plurality of first critical values.

16. The digital photographing apparatus of claim 13, wherein the first critical value comprises a 1-1 critical value and a 1-2 critical value, a critical value for determining the validity of the contrast peak value is set to be a 2-1 critical value when the luminance difference value is more than or equal to the 1-1 critical value, the contrast peak value is set to be invalid when the contrast peak value is less than the 2-1 critical value, and a critical value for determining the validity of the contrast peak value is set to be a 2-2 critical value when the luminance difference value is more than or equal to the 1-2 critical value, and the contrast peak value is set to be invalid when the contrast peak value is less than the 2-2 critical value.

17. The digital photographing apparatus of claim 13, further comprising an AF calculation unit configured to calculate a position of a focus lens according to the contrast peak value of the AF region, wherein the AF calculation unit is configured to exclude the contrast peak value in calculating the position of the focus lens when the contrast peak value is invalid.

18. The digital photographing apparatus of claim 13, wherein the AF region is a plurality of regions and the luminance detection area is a plurality of areas around each of the plurality of AF regions.

19. The digital photographing apparatus of claim 18, wherein the determination unit is further configured to compare the first critical value with a luminance difference value between a luminance value of one of the plurality of AF regions and a luminance value of a luminance detection area having the maximum luminance value among a plurality of luminance detection areas around the one of the plurality of AF regions.

20. A method of controlling a digital photographing apparatus, the method comprising:

setting an AF region and a luminance detection area of a digital image, wherein the luminance detection area is separate from the AF region;

calculating luminance values of a high frequency signal corresponding to the AF region and corresponding to the luminance detection area;

calculating a luminance difference value that is a difference between the luminance value of the AF region and the luminance value of the luminance detection area; and determining validity of an AF evaluation value with respect to the AF region according to the luminance difference value.

21. The method of claim 20, wherein the determining of the validity of the AF evaluation value comprises:

comparing the luminance difference value with a first critical value;

setting different critical values for determining the validity of the AF evaluation value according to a result of the comparison; and determining the validity of the AF evaluation value based on the AF evaluation value with respect to the AF region and the different critical values.

22. The method of claim 21, wherein, in the determining of the validity of the AF evaluation value, the AF evaluation value is determined to be valid when the AF evaluation value is more than or equal to a second critical value that is relatively more than or equal to the difference critical values, and the AF evaluation value is determined to be invalid when the AF evaluation value is less than the second critical value, and the AF evaluation value is determined to be valid when the AF evaluation value is more than or equal to a third critical value that is relatively less than the different critical values, and the AF evaluation value is determined to be invalid when the AF evaluation value is less than the third critical value.

23. The method of claim 21, wherein the first critical value is a plurality of values and a plurality of second critical values and a plurality of third critical values are set with respect to the plurality of first critical values.

24. The method of claim 21, wherein the first critical value comprises a 1-1 critical value and a 1-2 critical value, a critical value for determining the validity of a contrast peak value is set to be a 2-1 critical value when the luminance difference value is more than or equal to the 1-1 critical value, and the contrast peak value is set to be invalid when the contrast peak value is less than the 2-1 critical value, and a critical value for determining the validity of the contrast peak value is set to be a 2-2 critical value when the luminance difference value is more than or equal to the 1-2 critical value, and the contrast peak value is set to be invalid when the contrast peak value is less than the 2-2 critical value.

25. The method of claim 20, wherein the AF evaluation value is a peak value of a high frequency component of an image signal with respect to the AF region.

* * * * *